V. WRENN.
POULTRY RAISING PLANT.
APPLICATION FILED JAN. 20, 1914.
1,127,712.
Patented Feb. 9, 1915.
3 SHEETS—SHEET 1.
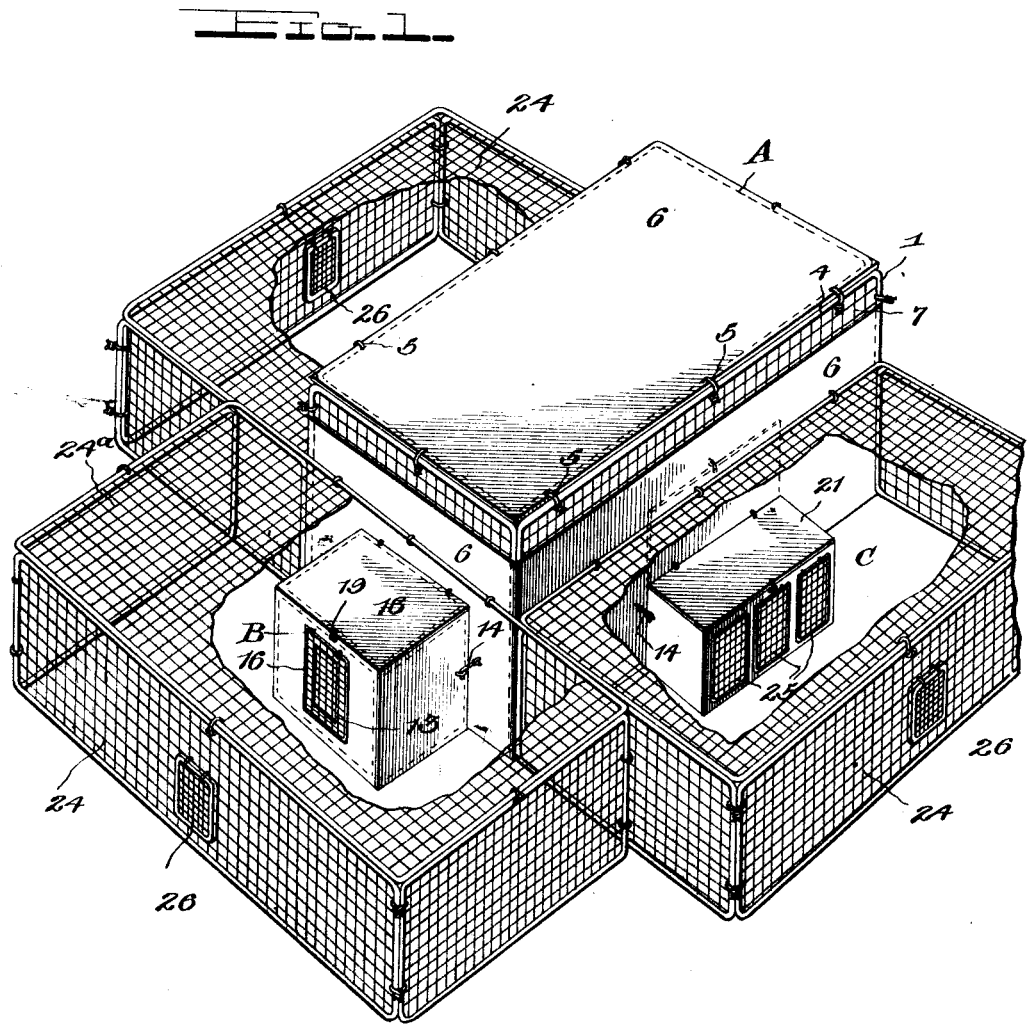
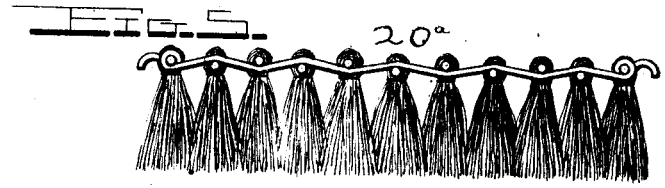

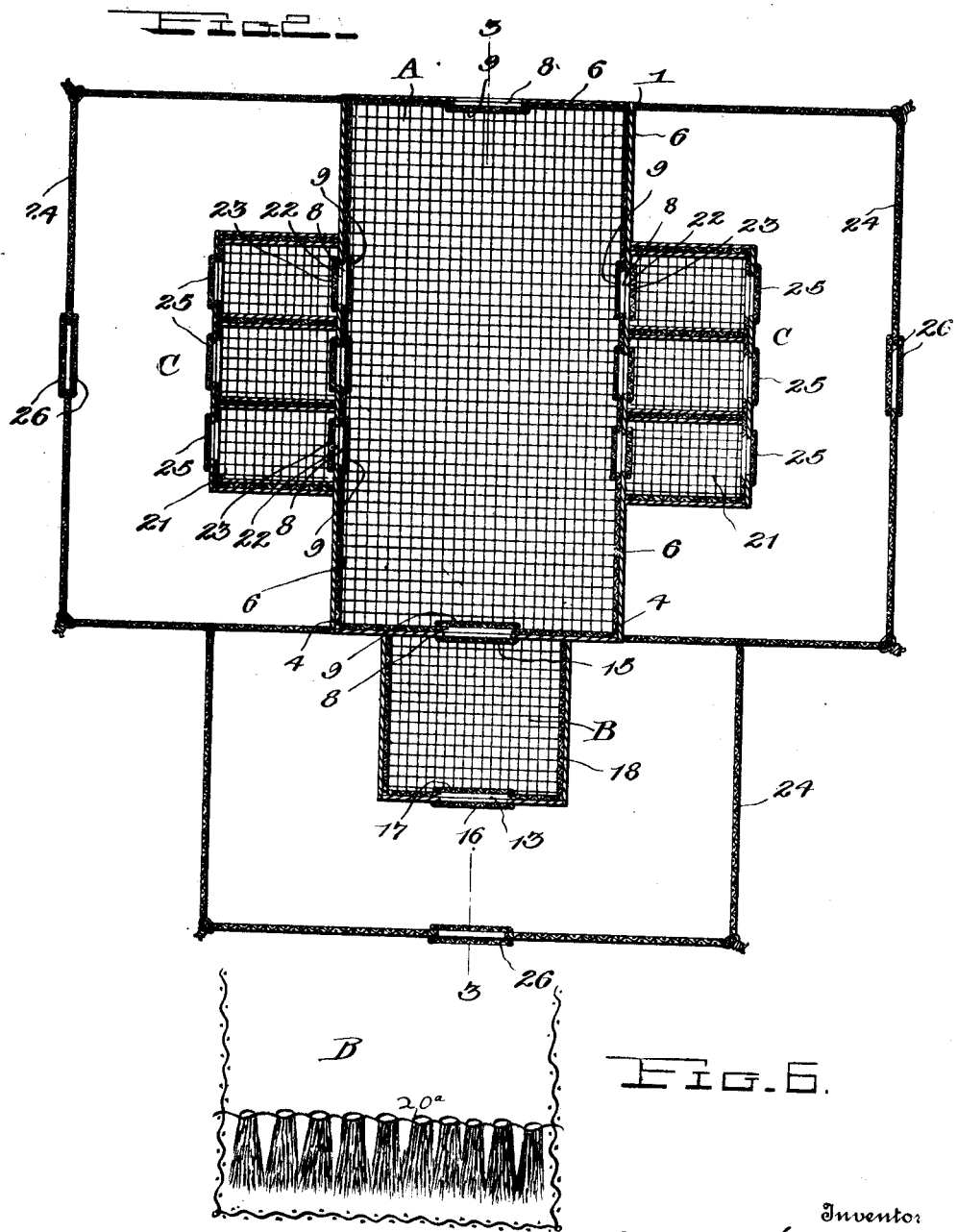

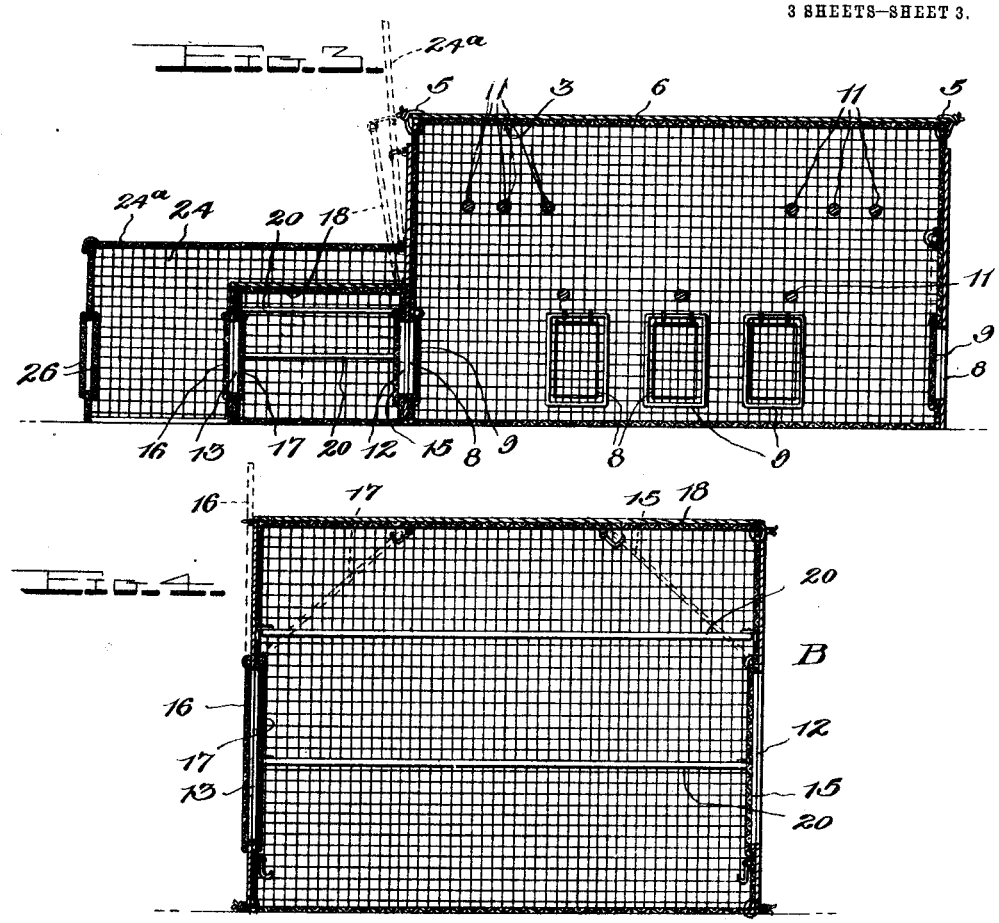

UNITED STATES PATENT OFFICE.

VIRGINIUS WRENN, OF AMELIA COURT HOUSE, VIRGINIA.

POULTRY-RAISING PLANT.

1,127,712.  Specification of Letters Patent.  Patented Feb. 9, 1915.

Application filed January 20, 1914. Serial No. 813,251.

*To all whom it may concern:*

Be it known that I, VIRGINIUS WRENN, a citizen of the United States of America, and a resident of Amelia Court House, county of Amelia, State of Virginia, have invented certain new and useful Improvements in Poultry-Raising Plants, of which the following is a full and clear specification, reference being had to the accompanying drawings, in which—

Figure 1 is a perspective view of the several units assembled into a complete plant, certain parts being broken away for the sake of a clearer disclosure; Fig. 2 is a horizontal section through the whole plant; Fig. 3 is a section taken on the line 3—3 of Fig. 2; Fig. 4 is a vertical section through one of the hovels; Fig. 5 is a detail view showing a mat intended for use in the brooding hovels, and Fig. 6 is a transverse vertical section through the lower part of one of the hovels showing the mat in position.

This invention involves improvements in chicken and other poultry raising plants, and pertains particularly to a cleanly and sanitary system of housing, breeding and laying apparatus.

The invention furthermore includes an arrangement of parts whereby a close observation of the fowls may be maintained for the purpose of noting the laying propensities of the hens, so that records of individual hens may be kept; and to permit the proper isolation of broods.

Poultry houses as heretofore built have been either of the class of permanent structures or have been of the knock-down type, which consists of heavy frames joined to form houses and plants which in their built-up state are as heavy and cumbersome as those of the permanent structure type. Other hen-houses are known as portable, so that new locations may be provided from time to time; but in this class, again, the question of cumbersome and heavy structures enters, and it is necessary to provide certain traction devices to effect the movement of the houses to new locations. Moreover, other known houses furnish numerous hiding places for the concealment of insect pests, much to the detriment of the health and comfort of the fowls.

In order to avoid the defects and unsatisfactory features of the prior art, my invention has for its primary object the provision of a sanitary portable hen-house and plant which can be readily moved from place to place as separate units.

The materials of which the unit system of house, nests, hovels and pens are made, consist of an open-work or skeleton steel-wire body or framing, covered where or when it is necessary with tin, water-proof paper, cloth or any other suitable material, according to governing conditions, or climatic requirements. The outside covering of the various units, which, as stated, may be of tin, paper or other suitable material, is to be either permanently or temporarily attached to the several frames or bodies; and in any degree as may be desirable or required for purposes of ventilation, supplying light and sunshine, or protection from cold, and for counteracting the variations of winter and summer. Furthermore, the points of contact between the wire frame and this covering are too small to shelter insect pests.

A further object consists in its unitary construction and assemblage of the main house, the nests, hovels and the pens, and their interrelation, whereby a system of observation of laying hens and broods may be carried out for the purpose of keeping records of eggs laid by each hen and giving the broods proper care. In this connection, a trap-door of particular structure, as hereinafter appears, becomes an important adjunct to the proper working of the system.

A further feature and purpose consists in the provision of a special bottom for each cage structure or unit, including the main house, nests and hovels. Thus, each of these cage structures or units is provided with a bottom of uncovered open-work metal material, of the same character as is used for the frame or body, and sufficiently open for the droppings from the fowls to fall directly upon the ground, instead of fouling the cages or units by accumulating upon the floors. It will be observed that this feature, in connection with the stability and lightness of the whole apparatus becomes of great utility and value, since the structures can be easily and thoroughly cleaned of all filth simply by lifting them to another spot, leaving the manure spread upon the ground, which may be a poor spot in a well-kept lawn. The grass-roots cannot be disturbed while the structure is located over the poor spot, since the wire bottom prevents scratching by the chickens or other fowls.

Another object of the invention resides in the location of the laying and setting nests and hovels, the latter being used for raising broods. Both the nests and hovels are located outside of the main house, so that they will not be fouled by the droppings from the roosts, and are removably attached to the main house by means of hooks or other fasteners, so that they can be interchanged or removed for various purposes. Each nest or hovel is complete in itself, and its removal from the main house does not disturb the general system, but merely varies the number and use of units which are in operation.

In connection with the exteriorly located nests and hovels, there are provided a set of restraining pens, also of wire-fabric material and consisting of sides and a hinged top, said pens being removably attached to the sides of the house and inclosing the nests and hovels of a side or end. The pens are also provided with the trap-door arrangement hereinbefore mentioned which are used to follow out the system of this invention.

The structure of the cage units which constitute the nests and hovels forms another feature of the invention. They are provided with hinged tops which can be fastened in open or shut position, and provide means of access to the nests for securing eggs, placing nesting material, setting fowls or caring for the young. When the trap-doors are closed, the nests are enticingly dark for laying and setting hens. In addition, the nests and hovels are each provided with ingress and egress openings of a proper size to admit the kind of fowl for which it is intended. One opening leads into the main house, and the other to the outside or into the pens, according to the arrangement maintained.

An important feature of the invention is found in connection with the above mentioned openings and the other necessary points of ingress and egress in the main house and the pens. Each of the openings, which are of such size as only to admit of the free passage of the fowls for which the opening is intended, is so placed that the arm of a marauder cannot easily reach the roosts, and is provided with double hanging closures or doors, slightly larger than the door-ways, and made of open wire-fabric or other material of such a degree of lightness that the fowl will easily and quickly learn to push through them. One door is hung on each side of the opening, so that the passage of the fowl therethrough can be wholly prevented, or its passage can be limited to one direction, according to whether one or the other or both doors are dropped over the opening. The object of this arrangement of doors is to make each one a "trap door,"
when desired. By this means also, the owner can be sure his fowls are shut up at night and until he chooses to let them out in the morning; and, furthermore, he can credit each fowl with the eggs she has laid; and can prevent other fowls from interfering with those that are setting, or those which have young.

Referring to the drawings, A indicates the main house, which acts as a nucleus cage unit around which the other cage units, such as pens, hovels and nests are grouped, and to which they are attached, but whose interior arrangement or capacity is never disturbed or encroached upon by the latter. Said main house A consists of the four sides 1, and, as best seen in Figs. 2 and 3, the bottom 2 and the top 3, suitably joined as later indicated. Each of the elements 1, 2 and 3 consists of a section of a skeleton or open-work wire-fabric of suitable construction and mesh. The wire skeleton framing preferably used having welded joints and possessing a high degree of rigidity, it is possible to shape the several elements without other framing than the outside strands of the section, but if desired, suitable frames as 4 can be provided to inclose the latter. The side sections 1 are united by any suitable fastening devices of a permanent or temporary character, simple wire ties 5 being shown in the drawings. By this simple method of joining the sections, a sufficient degree of permanence is secured to withstand all such usage as the sections themselves are called upon to stand while at the same time, the fastenings can be readily destroyed without appreciable loss, when it is desired to knock down the house. The bottom 2 and the top section 3 are secured to the four sides 1 in a similar manner, though, if desired, the top may be fastened on one side, in hinged relation to the sides, and secured by locking means on the opposite side.

The top section 3 is provided with waterproof covering 6, which may be of any suitable material, as tin, water-proof paper or fabric or a composition, fastened with staples or ties to the frame, and the sides 1 are similarly covered. The sides, as shown in Fig. 1, may be left uncovered for a short space at the top, as 7, to provide light and air, this probably being a suitable degree of exposure for ordinary summer weather and for fuller protection against the elements, the sides 1 can be covered to their top edges, and the covering of the top joined to the side covering, and, of course, the covering may be varied in thickness and extent for different kinds of weather.

The main house A is provided with doorways 8 which open therefrom on each of its sides and ends, said door-ways 8 being made of a size to permit the passage of fowls and being formed in such number on each side as to suit the requirements of the particular plant in use. In the structure shown in the drawings, three closely spaced door-ways or openings are disclosed on each of the long sides of the house 1 and a single door-way is provided on each end.

Inside of each door-way is a horizontally hinged valve or door 9 suspended by its upper edge to cover the opening and being of somewhat greater area than the opening so as to bear against the side of the house all around the opening. Said valves or doors 9 are preferably made of the same material as the house, and are of such slight weight, that they can be readily lifted by a chicken or other poultry pushing thereagainst from the opposite side of the opening. Any other material suitable for a light, serviceable door may obviously be employed however. Said doors 9 co-act with correspondingly hung doors on the insides of the hovels and nests, as later appears, to form therewith the double trap-doors which form a principal feature of the invention. Suitably extended across the house A, and out of the easy reach of the hands of any marauder who may stick his arms through the openings or door-ways 8 are the roosts 11, said roosts being formed of wooden rods or of pairs of parallel spaced wires.

At one end of the house A is or may be attached the brooder or hovel B. Said hovel B is, in all essential particulars, a smaller counterpart of the house A. The sides, bottom and top are formed of the same sort of wire-fabric and covering material from which the house is built, and the opposite ends are provided with door-ways 12 and 13 (Figs. 3 and 4). Said door-ways are made of the same size and distance from the ground or bottom of the hovel as are the door-ways in the main house, so that when the end of the hovel B is locked in place at the end of the house A, as by the latches 14, the openings 1 and 12 will be brought into coincidence to form a single doorway between the two units. Inside the door-way 12 of hovel B is suspended a door 15, similar to the doors 9, so that between the hovel B and the house A there exists a double-door or double-trap-door which may be adjusted to permit fowls to pass one way or the other or both ways, as conditions require. If it is desired that access may be had to the hovel from the house, but not a return access to the latter, the door 9 is fastened up by suitable hook or latch, and door 15 is left suspended over the opening. A chicken in house A may push aside the door 15 and gain access to the hovel B, but once therein cannot return through the same door. The reverse will obviously be the case, provided the door 9 is left suspended and the door 15 is secured away from the opening. In order to cut off all communication between house and hovel, both doors are left down to cover the opening. The doorway 13 at the opposite end of the hovel B is provided with two doors 16 and 17, one on the inside and the other outside, so that the same operation above described for doors 9 and 15 can be here followed out, in order to govern the use of the hovel. The hovel B is also suitably covered with tin, waterproof paper or a fabric, the top 18 is hinged to the hovel at its rear edge and can be fastened down by means of latch 19. Access is thus given to the interior of the hovel for the purpose of caring for broods. Small roosts 20 are mounted across the hovel at suitable heights, so that young fowls will easily learn to use them, in preparation for their introduction into the main house. In Fig. 5 is shown a mat 20ᵃ which may be movably suspended in the hovel or brooder B when incubator chickens are placed therein, the mat consisting of a suitable body or frame of wire-fabric to which are tied or otherwise secured depending tufts of soft material under which the young fowls can go for warmth and protection. It can be raised or lowered as required by the size of the young fowls.

The nests hereinbefore mentioned are indicated at C, and while they may be constructed as single cage units, it has been found preferable to construct them in banks. Thus the structure C constitutes a bank or set of three nests, which is disposed and fastened by hooks 14, opposite a set of three openings in the house A. The nest structure C is built up, as are the elements A and B, of wire-fabric and is suitably partitioned off (Fig. 2) with the same material. The walls and top are also covered with tin, paper or other fabric to provide a protection to the nesting or laying hen and to make the interior suitably dark. The nesting material is placed in the nests through the top 21, which is hinged to the structure for this purpose. The nests are also provided with doorways in their opposite ends, and those openings 22 which come into registration with the door openings 8 in house A are interiorly provided with the doors 23 which form with the opposing doors 8 the trap-door arrangement between the house and individual nests. The outer ends of the nests, however, are provided only with exterior doors, so that it is possible for a hen to come out at the outer end, but is prevented from returning therethrough for the purpose which will later appear.

Across each side and one end of the house may be arranged the pens 24. Each pen 24 incloses, with the desired area of ground space, a hovel or hovels or a group of nests, and act as restraining inclosures for the fowls. A pen may be placed at the other end of the house also if desired. The pens are formed of three side elements and a hinged top 24ᵃ similar to the nest and hovel structures, and are fastened to the house at suitable points by hooks, latches or ties. Each pen is provided with a door-way closed by a double trap-door of the character already described, so that the passage of chickens to and from the pens to the outside grounds may be suitably governed.

As has been hereinbefore stated, the apparatus which has been described involves a unitary system of poultry raising, other than the mere housing thereof, and which may be briefly stated as follows: The chickens and other fowls are housed an sheltered in the main house A, access to which is gained through the door 8 on the free end thereof. On each side of the house are arranged the nests C, either for laying or setting. Each nest is provided with trap-doors for governing the ingress and egress of chickens, and in the case of laying hens the inner door 9 is fastened in open position and the door 23 left suspended. A laying hen seeking its nest, pushes under the door 23 to enter, and after laying, finds it only possible to pass out through the outer door 25 into the pen 24. The doors in the pen have been previously set to prevent the escape of any fowl entering the pen from the nests, so that the hens which have passed through the nests may be suitably noted before being released. In the case of setting hens, the double trap-door arrangement provides a suitable means for preventing the hen from being disturbed by other chickens and she is given free access to the pen for feeding and exercising by fastening open the outer door.

The hovels provide for the confinement of the mother while the young are permitted to pass through the meshes of the fabric walls of the hovel and into the pen, or, the doors may be arranged so that the mother may also go into the pen. Furthermore, in cases where the young are incubator chickens, the hovel can be fitted with the mat which has been described, and while being cared for as an independent brood, naturally and quickly adjust themselves to the habits of the other chickens in the house by having the same conditions provided.

The advantages accruing from my improved poultry plant have been set forth hereinbefore, but it should be noted that the assembled cage structures or units of the plant constitute a larger unitary structure which may be readily moved by a man or a couple of young boys of average strength from one place to another; and, furthermore, that either the house or the hovel and nest elements used separately or together afford practical shipping and exhibition crates for fowls; in the latter case, suitable feed and water receptacles being attached. It is evident that a thief could not gain access to the house by any opening or door provided, and should he try to disassemble the arrangement it would be sure to disturb the fowls sufficiently to attract attention. Rats and insect vermin are given no hiding place within any of these units and are, therefore, not troublesome, while the general openness of the structure with full control over ventilation decreases the liability to disease of the chickens or other fowls.

It is evident that the size and particular arrangement of the plant as regards house, nests and hovels is a matter decided by conditions and the size of the flock of fowls to be cared for, and that the showing of the drawings discloses only one combination of many which may be made within the scope of my invention. Also, the hovels or brooders can be used detached from the house in direct connection with incubator systems, and the nests may be used with other housing devices, as they are freely movable and adaptable.

What I claim as my invention is:—

1. In a poultry raising plant, the combination of a main house having an entrance at or near one end and having walls and bottom, the walls being provided with a series of exit openings, a series of cage units removably affixed to the walls of the main house over said exit openings, these cage units being likewise provided with bottoms, restraining pens removably attached to the walls of said main house so as to inclose the cage units, and a plurality of independent trap doors arranged to either permit or prevent the fowls passing from the main house to the nests or vice versa, and to permit the fowls to pass from each nest to the pen inclosing the same but prevent the fowls returning to the nest from the pen.

2. In a poultry raising plant, the combination of a main house having an open-work bottom and provided with an entrance at one end, exit openings at the side and at the rear of the main house, a cage structure over each one of said exit openings, each of said cage structures having open-work bottoms and being removably attached to the main house and being also provided with a plurality of independent trap doors arranged to either permit or prevent the fowls passing from the main house to the nests or vice versa, and to permit the fowls to pass from each nest to the pen inclosing the same but prevent the fowls returning to the nest from the pen and from each of the cage units back into the main house, a restraining pen attached to each side wall of the main house and inclosing the cage units attached to that side wall, and another restraining pen inclosing the cage unit at the rear end of the main house and removably attached to the rear wall of the main house.

3. In a poultry plant, the combination of a main house, restraining pens located around the house, cage structures in said pens and communicating with said house, and pairs of trap doors hung between said house and cage structures, to be alternatively released to operative position to permit access either way between the house and cage structures, and trap doors on said cage structures giving access only to said pens.

4. In a poultry raising plant, the combination of a main house having a series of openings, each of which is closed by a trap door, cage units removably attached to said house, each being provided with a trap door closing one of said openings and each also having an exit opening, said trap doors on the house and on each cage unit being capable of adjustment to operative position to permit access each way through the cage unit.

5. In a chicken-raising plant, the combination of a main house, a series of nest units communicating with said house by means of door-ways therebetween, a trap-door suspended on each side of each communicating door-way between nest units and said main house, either trap-door being capable of being fastened away from its respective door-way to permit access one way therethrough, and trap-doors on free sides of said house and nest units to permit access to the former and from the latter.

6. In a chicken raising plant, a structure comprising sides, top and bottom, said sides having doorways formed therein and doors hung on opposite sides of each doorway, which may be alternatively placed in inoperative position to provide for the use of each doorway as an exit or inlet passageway exclusively.

In testimony whereof I hereunto affix my signature in the presence of two witnesses.

VIRGINIUS WRENN.

Witnesses:
J. C. EGGLESTON,
R. D. HANLY.